United States Patent [19]
Esplin

[11] 3,789,535
[45] Feb. 5, 1974

[54] FISHING POLE AND REEL ASSEMBLY

[76] Inventor: William E. Esplin, 15445 Labrador St., Sepulveda, Calif. 91343

[22] Filed: May 24, 1972

[21] Appl. No.: 256,305

[52] U.S. Cl. .................................................. 43/22
[51] Int. Cl. ....................... A01k 87/06, A01k 89/02
[58] Field of Search .................... 43/22, 23, 21.2, 20

[56] References Cited
UNITED STATES PATENTS

| | | | |
|---|---|---|---|
| 2,599,219 | 6/1952 | Berchak | 43/20 |
| 3,196,571 | 7/1965 | Esplin | 43/20 |
| 2,311,823 | 2/1943 | Gaskill, Sr. | 43/21.2 |
| 3,491,475 | 1/1970 | Mann et al. | 43/20 |
| 1,240,677 | 9/1917 | Cook | 43/22 UX |
| 3,501,859 | 3/1970 | Perkins | 43/22 |

*Primary Examiner*—Louis G. Mancene
*Assistant Examiner*—James H. Czerwonky
*Attorney, Agent, or Firm*—Christie, Parker & Hale

[57] ABSTRACT

A fishing pole and reel assembly includes an elongated tapered fishing pole having a butt end and a tip end, a reel support frame made from substantially rigid sheet material shaped to form a flat central base having a pair of laterally spaced apart flat side plates extending upwardly from opposite sides of the base, and a spool carrying a fishing line and secured to an axle rotatably mounted in bearings between the side plates. Separate crank arms, for use in turning the spool, are rigidly secured to the ends of the axle adjacent the outer edges of the side plates, and extend in opposite directions from the axis of the axle. The butt end of the fishing pole is secured to the front of the base, and a handle is secured to the rear of the base. The front edge of the base has a pair of angle tabs projecting downwardly to be fitted over the railing or a boat to support the reel frame. A thumb-operated fishing line brake arm is pivotally mounted between the side plates to engage the line on the spool to slow the line release rate.

8 Claims, 6 Drawing Figures

Patented Feb. 5, 1974

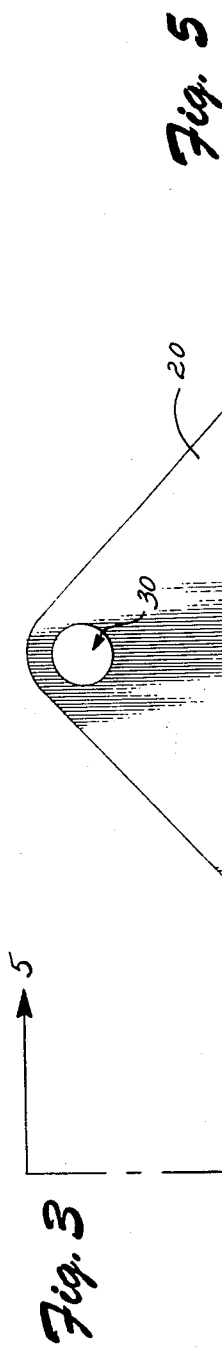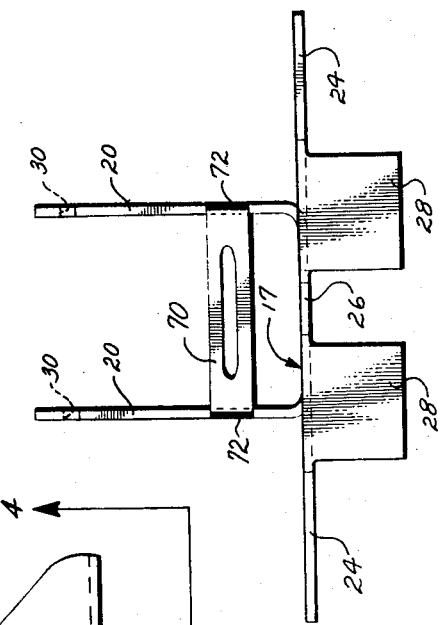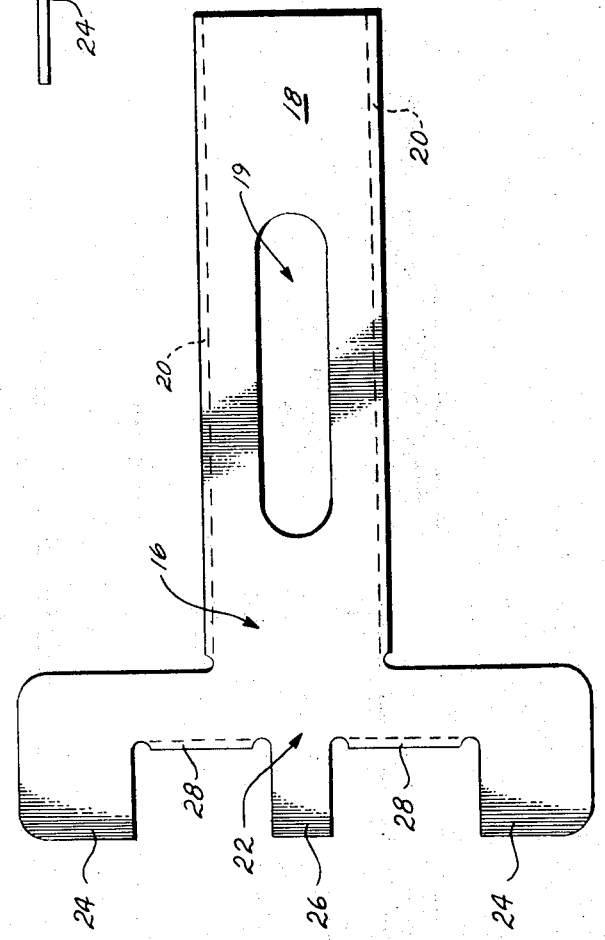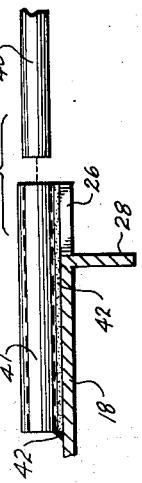

3,789,535

FISHING POLE AND REEL ASSEMBLY

BACKGROUND OF THE INVENTION

This invention relates to fishing apparatus, and more particularly to an improved fishing pole and reel assembly for deep water fishing.

In deep water fishing, the fish generally are of considerable weight, and accordingly, the fisherman's pole and reel assembly must be sturdy and durable to land the fish after it has taken the bait. Moreover, the fishing apparatus must be constructed so that the fisherman can efficiently apply his energy to the reel handles when reeling in the fish.

Conventional deep water fishing apparatus has been relatively expensive because of the need for rugged construction. Since the cost of good equipment is so high, many persons are discouraged from otherwise gaining an interest in deep water fishing.

SUMMARY OF THE INVENTION

This invention provides an improved fishing pole and reel assembly which is sturdy and durable, and is structured so it lends itself to being fabricated by low-cost commercial methods from relatively inexpensive materials. Thus, the invention makes it possible to mass produce "poor man's" fishing poles which can be sold at relatively low prices while still being highly proficient for deep water fishing.

Briefly, the fishing apparatus comprises a fishing pole having a butt end and a tip end, and a reel support frame made from substantially rigid sheet material shaped to form a flat central base and a pair of laterally spaced apart side plates extending upwardly from the outer edges of the base. The butt end of the pole is rigidly secured to the frame base. An axle is rotatably mounted between the side plates, and a spool for carrying a quantity of fishing line is secured to the axle. A pair of manually operated crank means are connected to the ends of the axle, exteriorly of the side plates, and extend substantially 180° out of phase with each other for use in turning the spool.

The reel support frame lends itself to being fabricated at a relatively low cost. For example, sheet metal is relatively inexpensive, and can be formed into the shape of the frame by using a relatively low cost stamping process. The pole is then simply welded to the base of the frame, and the reel axle is mounted in bearings which are simply press fitted into the side plates of the frame. Alternately, the frame and pole can be made from fiberglass.

Preferably, the front edge of the frame base projects downwardly to form an angle tab for supporting the frame on the railing of a boat, or the like, during use. Thus, the fisherman can efficiently apply his energy to turning the reel crank when reeling in a fish.

In the preferred form of the invention, an elongated brake arm is rigidly secured to a second axle which, in turn, is rotatably mounted between the side plates. The brake arm can be thumb-operated by the fisherman to apply a retarding force to the reel to slow down the release rate of the fishing line.

BRIEF DESCRIPTION OF THE DRAWINGS

These and other aspects of the invention will be more fully understood by referring to the following detailed description and the accompanying drawings in which:

FIG. 3 is a plan elevation view showing a sheet metal stamping which forms the reel and pole support structure for the fishing apparatus shown in FIGS. 1 and 2;

FIG. 4 is a plan elevation view taken on line 4—4 of FIG. 3;

FIG. 5 is an elevation view taken on line 5—5 of FIG. 3; and

FIG. 6 is an exploded elevation view, partly in section, showing means for releasably securing an existing fishing pole to the reel assembly of this invention.

DETAILED DESCRIPTION OF THE PREFERRED EMBODIMENT

Figure 1:
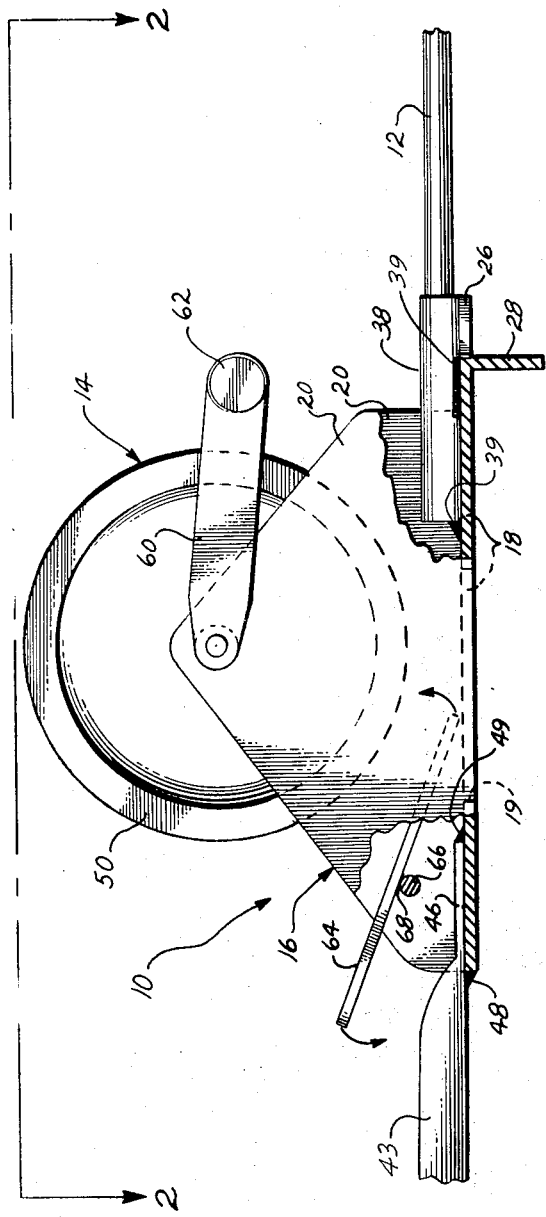
FIG. 1 is a fragmentary elevation view, partly broken away, and partly in section, showing a fishing pole and reel assembly.
Figure 2:
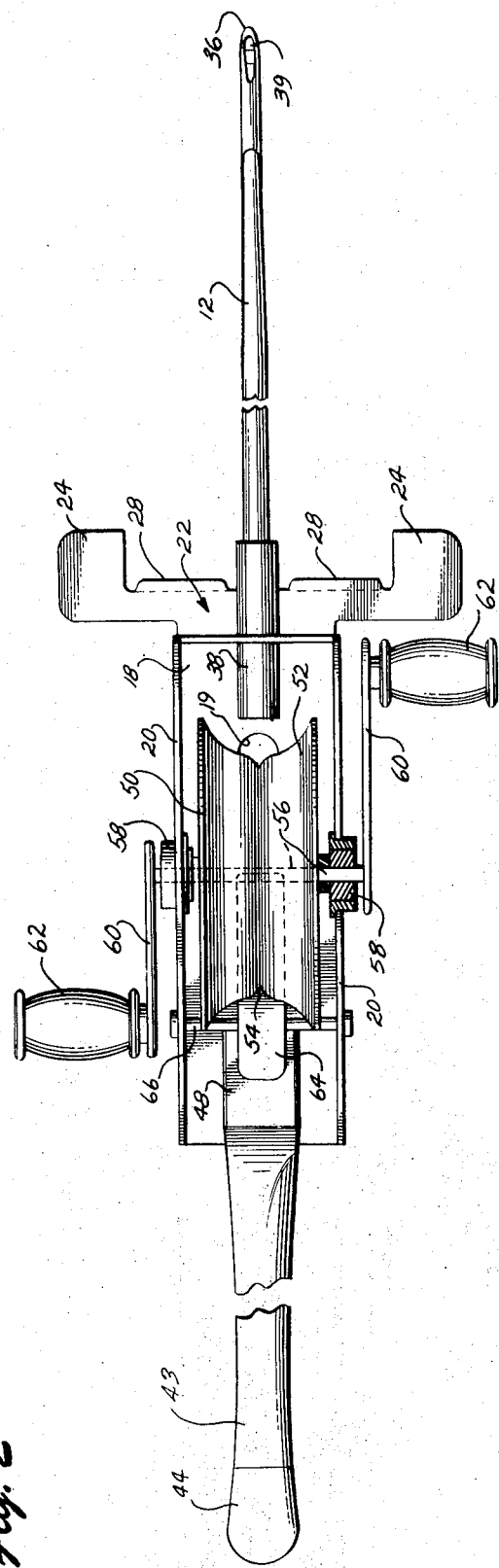
FIG. 2 is a fragmentary plan elevation view, partly in section, taken on line 2—2 of FIG. 1.

FIGS. 1 and 2 show fishing apparatus 10 which can be made from a variety of materials and fabrication methods. The fishing apparatus to be described is made of metal, but it is understood that other materials, such as fiberglass, can be used without departing from the scope of the invention. The fishing apparatus includes a tapered, elastically bendable, elongated fishing rod 12 made of metal, a reel assembly 14, and a reel and pole support frame 16.

As shown best in FIGS. 3, 4, and 5, frame 16 preferably is made from a sheet metal stamping, a major portion of which is bent into a substantially U-shape when the frame is viewed from the ends as in FIG. 5. The frame is substantially T-shaped when viewed in plan view as in FIG. 4, and has a substantially rectangular, flat, narrowed base 18, the outer edges of which are bent upwardly at right angles to form a pair of laterally spaced apart side plates 20 extending the length of the base. The side plates taper narrower in width toward their top edges, and are substantially inverted U-shape in form when viewed from the side as in FIG. 3. A narrow, longitudinally extending, elongated opening 19 is formed in an intermediate portion of base 18.

As shown best in FIG. 4, the front portion of frame 16 forward of the side plates increases in width to form a flat, transversely extending wide leg 22 which is substantially E-shaped in plan view. The leg includes a pair of laterally spaced apart outer fingers 24 projecting away from the side plates, a central finger 26 between outer fingers 24 projecting in the same direction as finger 24, and a separate, substantially rectangular, flat, elongated angle tab 28 between each outer finger and the central finger, each angle tab being bent downwardly at a 90° angle relative to the plane of fingers 24 and 26.

A pair of concentrically aligned large openings 30 extend through the narrow top portions of plates 20. A second pair of concentrically aligned small openings 34 extend through the wider portion of the side plates near the rear of the frame.

Frame 16 lends itself to being fabricated from a relatively inexpensive three-step sheet metal stamping process. The frame is first stamped out of sheet metal in flat form. A die then bends the metal to form side plates 20, and a second die bends down the front portions of leg 22 to form angle tabs 28.

Referring again to FIGS. 1 and 2, fishing rod 12 has a tip end 36 and a butt end 38. A plurality of longitudinally spaced apart fishing line guides (not shown) are spaced along the length of the rod. A length of fishing line is threaded through the guides and through a conventional roller tip 39 at the tip end of the rod. The butt end of the rod comprises an enlarged cylindrical shaped body having a central bore into which the end of rod 12 makes a tight press fit. Butt end 38 overlies the front central portion of base 18 and finger 26. The butt end of the pole is rigidly secured to base 18 by welding 39. As shown in FIG. 6 an existing fishing pole 40 can be releasably secured to the pole support frame and reel assembly. In this form of the invention, an elongated, tubular metal sleeve 41 is rigidly secured to the front of frame 16 by welding 42. The frame and reel assembly can then be manufactured without a fishing pole secured to it, and the fisherman can releasably secure his fishing pole 40 to the frame by inserting it into the hollow opening in sleeve 41.

An elongated metal handle 43 is secured to the rear portion of base 18. Handle 43 includes a butt end 44, and a flat forward end 46 which overlies the upper surface of the rear central portion of the base, and is rigidly secured thereto by spot welds 48 and 49.

The construction of the fishing pole 12 and handle 43 add to the ability to manufacture the fishing apparatus at a low cost. Preferably, rod 12 is a relatively inexpensive common elongated steel rod. The rod, together with the handle, are simply welded to the top of base 18, which is a quick and inexpensive procedure. Moreover, the welded steel construction of the fishing apparatus makes it especially rugged, and therefore especially suitable for deep water fishing.

Reel assembly 14 includes a circular spool 50 having a peripheral rim 52 (see FIG. 2) forming an outwardly opening, substantially U-shaped groove 54 extending around the circumference of the spool. The spool preferably is a pulley wheel which is commonly manufactured in mass at a relatively low cost. The spool is mounted between side plates 20 and rotates about a transversely extending, elongated axle 56. The axle rotates in bearings 58 which make a tight press fit in openings 30 of the side plates.

A pair of crank arms 60 are connected to opposite ends of axle 56 exteriorly of the side plates and extend in opposite directions from the longitudinal axis of the axle. Manually engageable and outwardly extending handles 62 are secured to the free ends of the crank arms.

In use, a quantity of fishing line (not shown) is secured circumferentially to the spool and threaded through guide loops and the roller tip of rod 12. The spool 50 may be allowed to run freely in a clockwise direction (as shown in FIG. 1) to pay out fishing line, such as when a bait or lure is cast.

A flat elongated brake arm 64 is rotatably mounted between side plates 20 on a transversely extending second axle 66 rotatably mounted in opening 34. The brake arm preferably is made from a sheet metal stamping, and is rigidly secured to the top of the axle by welding 68. The brake arm extends under the spool, and is of sufficient length that it may be rotated into contact with fishing line on the spool simply by rotating the arm in a counter-clockwise direction represented by the arrows in FIG. 1. In use, the brake arm imposes a drag on spool 50 to control the amount of line being reeled out by the fisherman.

An elongated transversely extending brace member 70 (shown best in FIG. 5) extends between the edges of the side plates 20 to brace the side plates. Preferably, bracing member 70 is rigidly secured at its ends to the side plates by welding 72.

Thus, the fishing pole and reel assembly described above can be manufactured at a relatively low cost from inexpensive sheet metal stamping and welding procedures, and from parts, such as the rod, reel, and sheet metal, which are common, relatively inexpensive, materials. Moreover, the fishing apparatus, in its assembled form, is sturdy and durable, and therefore especially suitable for deep water fishing.. The fishing pole and reel assembly also lends itself to being manufactured by other inexpensive fabrication methods and materials, such as fiberglass.

I claim:

1. Fishing apparatus comprising an elongated fishing pole having a butt end and a tip end; a reel support frame made from substantially rigid sheet material shaped to form a flat central base, and a pair of laterally spaced apart side plates integral with and extending upwardly from opposite sides of the base, the base having a front portion and a rear portion, the butt end of the pole being secured to the front portion of the base; an elongated handle secured to the rear portion of the base; a separate bearing mounted in each side plate; a first axle journaled in the bearings; a spool secured to the first axle between the side plates for free rotation with the axle in clockwise and counterclockwise directions, the spool having a pair of laterally spaced apart outer rims, and a recessed portion therebetween for carrying a quantity of fishing line wound circumferentially on said recessed portion; crank means secured to each end of the handle exteriorly of the side plates and disposed substantially 180° out of phase with each other for rotating the spool in clockwise or counterclockwise directions to reel in or pay out the fishing line; a second axle rotatably mounted between the side plates between the handle and the point of attachment of the first axle to the side plates; and an elongated fishing line brake member rigidly secured to the second axle and extending under the recessed portion of the spool for contact with the fishing line thereon when operated manually by the user holding the handle of the fishing apparatus, said brake member having a width less than the width of said recessed portion.

2. Apparatus according to claim 1 in which the frame is made from a flat sheet metal stamping in which the side plates are bent at an angle with respect to the base.

3. Apparatus according to claim 2 in which the butt end of the pole is made of metal, and is secured to the plate base by welding.

4. Apparatus according to claim 3 in which the base has a front portion and a rear portion, and in which the butt end of the pole is secured to the front portion of the frame base, and including a handle having a metal portion rigidly secured to the rear portion of the frame base by welding.

5. Apparatus according to claim 1 in which the base has a front section which projects downwardly to form a frontal angle plate for the frame for use in fitting over a fixture of a boat, or the like.

6. Apparatus according to claim 1 in which the base has laterally spaced apart front sections which project downwardly to form a pair of angle tabs, and in which a portion of the front section of the base between tabs protrudes forward of the tabs to form a portion of the base to which the butt end of the pole is secured.

7. Apparatus according to claim 1 including means on the frame for releasably securing the butt end of the pole in a fixed position relative to the frame.

8. Fishing apparatus for use in holding an elongated fishing pole having a butt end and a tip end, the apparatus comprising a reel support frame made from substantially rigid sheet material shaped to form a flat central base and having a pair of laterally spaced apart side plates extending upwardly from opposite sides of the base, the base having laterally spaced apart front sections which project downwardly to form a pair of angle tabs, and in which a portion of the front section of the base between the angle tabs protrudes forward of the tabs to form a portion of the base to which the butt end of the pole is secured, means for securing the butt end of the pole to the base, an axle rotatably mounted between the side plates, a spool adapted to carry a fishing line and secured to the axle between the side plates for rotation with the axle, and crank means secured to each end of the axle exteriorly of the side plates and disposed substantially 180° out of phase with each other.

* * * * *